(12) United States Patent
Spanevello (10) Patent No.: US 11,118,993 B2
(45) Date of Patent: Sep. 14, 2021

(54) DEVICE FOR MEASURING A PHYSICAL PARAMETER OF A FLUID OF A MOTOR VEHICLE CIRCUIT

(71) Applicant: AKWEL, Champfromier (FR)

(72) Inventor: Marco Martino Spanevello, Venasque (FR)

(73) Assignee: AKWEL, Champfromier (FR)

( * ) Notice: Subject to any disclaimer, the term of this patent is extended or adjusted under 35 U.S.C. 154(b) by 396 days.

(21) Appl. No.: 16/362,883

(22) Filed: Mar. 25, 2019

(65) Prior Publication Data

US 2019/0301957 A1   Oct. 3, 2019

(30) Foreign Application Priority Data

Mar. 30, 2018 (FR) .................................... 18/70371

(51) Int. Cl.
| | | |
|---|---|---|
| *G01L 19/14* | (2006.01) | |
| *G01L 19/00* | (2006.01) | |
| *G01D 11/24* | (2006.01) | |

(52) U.S. Cl.
CPC .......... *G01L 19/143* (2013.01); *G01D 11/245* (2013.01); *G01L 19/0084* (2013.01); *G01L 19/147* (2013.01); *G01L 19/149* (2013.01)

(58) Field of Classification Search
CPC ... G01L 19/143; G01L 19/142; G01L 19/147; G01L 19/149; G01L 19/0084; G01D 11/245; G01D 11/26; G01D 11/30; G01D 21/02
See application file for complete search history.

(56) References Cited

U.S. PATENT DOCUMENTS

| | | | | |
|---|---|---|---|---|
| 3,820,402 A | * | 6/1974 | Interrante | ........... F16C 11/0638 73/723 |
| 2003/0107491 A1 | | 6/2003 | Sasaki et al. | |
| 2011/0126612 A1 | * | 6/2011 | Shimizu | ................. G01N 27/12 73/31.05 |
| 2015/0040673 A1 | * | 2/2015 | Schlitzkus | ............ G01L 19/148 73/706 |

FOREIGN PATENT DOCUMENTS

| | | |
|---|---|---|
| DE | 102012201416 A1 | 8/2013 |
| EP | 2559987 A2 | 2/2013 |
| FR | 3030740 A1 | 6/2016 |

* cited by examiner

*Primary Examiner* — Suman K Nath
(74) *Attorney, Agent, or Firm* — Oliff PLC (57) ABSTRACT

The device includes a distal connector portion with a connector for electrical connection to an external electrical circuit, a proximal measuring portion including a detector of the physical parameter configured to be in fluid contact, the detector has a general shape of a wafer delimiting a first electrical contact face and a second opposite measuring face, a member for electrically joining the detector and the connector. The detector is configured in the device such that both faces of the detector are immersed and in direct fluid contact.

23 Claims, 6 Drawing Sheets

DEVICE FOR MEASURING A PHYSICAL PARAMETER OF A FLUID OF A MOTOR VEHICLE CIRCUIT

The present invention relates a device for measuring a physical parameter of a fluid, such as a fluid circulating in a motor vehicle circuit. It applies more particularly, but not exclusively, to the measurement of the pressure or the temperature of the fluid circulating in such circuits or else to the measurement of the humidity residing in these circuits.

Such a measuring device is particularly adapted to be installed in different circuits of the motor vehicle such as brake assist circuits, vacuum circuits for driving the auxiliaries, fuel circuits, fuel vapor and/or oil vapor circuits, cooling circuits, pollution control fluid circuits (urea solution, particle filter additives), etc.

In general, as known in particular from the document EP 2 559 987 A2, the device comprises a casing body comprising a first distal connector portion and a second proximal detector portion delimiting a measuring chamber provided with an axial extension configured to be at least partially immersed in the medium. The two portions are assembled together to form a sealed volume inside which an element for detecting the physical parameter to be measured extends.

In the solution proposed by this document, the detection element comprises a printed circuit wafer provided with a first face facing the medium to be studied and in contact with the fluid via the measuring chamber and a second face in electrical contact with the connector portion by movable electrical contacts relative to the second face.

In order to sealingly isolate the electrical contacts and the second face supporting the electronic circuits, the device comprises a fluid seal allowing to prevent infiltration of the fluid from the measuring chamber into the volume inside which the second face extends. Moreover, the two connector and detector portions are assembled by crimping and then by depositing a resin to protect the internal volume from the intrusion of various contaminants such as for example humidity, dust, etc. Consequently, only the measuring face of the detection element is exposed to the fluid, the other face being protected from humidity and fluid inside the sealed volume.

The drawback of this type of measuring device is that, in order to ensure an effective sealing of the sealed volume against the fluid, the fluid sealing O-ring should be strongly axially compressed which has the effect of exerting significant mechanical stresses on the wafer of the detection element.

However, this wafer supports the pressure-sensitive element and the mechanical stresses applied thereon can alter the signal generated by the pressure-sensitive element. An individual calibration should consequently be performed to compensate for this deviation.

Furthermore, in this same document, the temperature-sensitive element is deported inside the measuring chamber which complicates the measuring device.

The object of the invention is in particular to provide a device for measuring a physical parameter of a motor vehicle fluid which allows overcoming these drawbacks by proposing a measuring device having a simple design and a high measurement accuracy.

To this end, the invention relates to a device for measuring a physical parameter of a fluid, in particular a fluid of a motor vehicle circuit, comprising a casing having a main axis X, said casing comprising a distal connector portion comprising a connector for electrical connection to an external electrical circuit and a proximal measuring portion comprising a detector of the physical parameter configured to be in fluid contact, the detector has a general shape of a wafer delimiting first and second opposite faces, a member for electrically joining the detector and the connector, characterized in that the device comprises a fluid sealing body configured to intimately cover at least the first electrical contact face of the detector by ensuring a sealing continuity with a junction area of the detector with the electrical junction member and in that the detector is configured in the device such that both faces of the detector are immersed and in direct fluid contact.

Thanks to this vertical arrangement of the detector and the presence of the sealing body instead of an O-ring seal, the pressure and/or temperature measurement made by the detector is very reliable. Indeed, the absence of an axial compression of an O-ring seal allows protecting the detector from an interference signal. Furthermore, because the detector is in direct fluid contact thanks to the protection provided by the sealing body, the temperature measurement has a high reliability as well as the pressure measurement.

A measuring device may further include one or more of the following characteristics.

In a preferred embodiment of the invention, the detector extends transversely and is retained to the measuring portion via the junction member.

In a preferred embodiment of the invention, the measuring portion delimits a housing configured to vertically receive and retain the detector such that the faces of the detector extend substantially parallel to the main axis X.

In a preferred embodiment, the connector and detector portions are transversely separated from each other by a partition wall provided with at least one through orifice through which the electrical junction member extends on both sides of the wall.

Preferably, the connector is formed by a distal portion of the electrical junction member protruding inside the connector portion.

Preferably, the junction member comprises a plurality of metal pins which protrude in the extension of a face of the detector. Thus, thanks to this additional characteristic, the pins can be directly welded on the printed circuit wafer which allows avoiding any risk of bad contacts, voltage drops caused by the contact resistance, errors in reading the signals. The absence of movable contacts and the presence of welded pins in addition has the advantage of being able to apply a protective layer before or after assembling the pins in order to improve the chemical resistance of the detector in the aggressive media.

In a preferred embodiment, the connector body comprises an end-piece delimiting a hollow body inside which the connector protrudes.

In a preferred embodiment, the sealing body is formed by a coating layer deposited on the surface of the detector made from a sealing material that can flow, for example a polymer resin.

Preferably, the housing comprises, at a distal end, a base which forms a tray to contain a sealing material that can flow, for example a polymer resin.

In a preferred embodiment, the sealing body is formed by a coating layer deposited on a surface of the detector made from a sealing material that can flow in a first state and that can be solidified in a second state, for example a polymer resin.

In a preferred embodiment of the invention, the housing comprises, at a distal end, a base which forms a tray to contain a sealing material that can flow, for example a polymer resin.

In a preferred embodiment of the invention, the sealing material is configured to be solidified in the tray in order to form a mass for anchoring a distal end of the detector, the tray comprising at the bottom an orifice for the passage of the junction member.

Preferably, the sealing body is formed by a single sealing material configured to cover the outer surface of the detector by forming a layer and to form a mass at the distal end of the detector.

Preferably, the housing extends axially and is almost totally perforated on its proximal end in order to allow a circulation of the fluid around the detector.

Preferably, the housing is formed at its proximal end by profiled guide rails.

Preferably, the sealing body is provided with a peripheral edge provided with a thickened free end forming a sealing lip configured to be partially housed in an outer peripheral relief of the casing.

In a preferred embodiment, the sealing body is made of an elastically deformable material such as an elastomer.

In a preferred embodiment, the detector comprises at least one element sensitive to a physical parameter selected from a humidity sensor, a pressure sensor and a temperature sensor.

Preferably, the wafer of the detector comprises a main portion and an axial extension having a narrowed cross-section.

The invention also relates to a system for measuring a fluid parameter, comprising a device for detecting a physical parameter and a support of the measuring device, said support comprising a fluid circulation chamber, characterized in that the measuring device being according to the invention, the device and the support comprise complementary assembly element and in that, in the assembled position, the detector is configured to extend inside the fluid circulation chamber.

For example, the support comprises two end-pieces for connection to at least two segments of an external fluid circulation conduit.

Preferably, the support comprises a cylindrical portion of revolution about the main axis X forming the measuring chamber and an axial extension configured to be inserted inside an orifice of a fluid circulation conduit.

Preferably, the device and the support delimit, in the assembled state, a peripheral groove for receiving an environment O-ring seal.

Other characteristics and advantages of the invention will appear in light of the following description, made with reference to the appended drawings in which.

Figure 1:
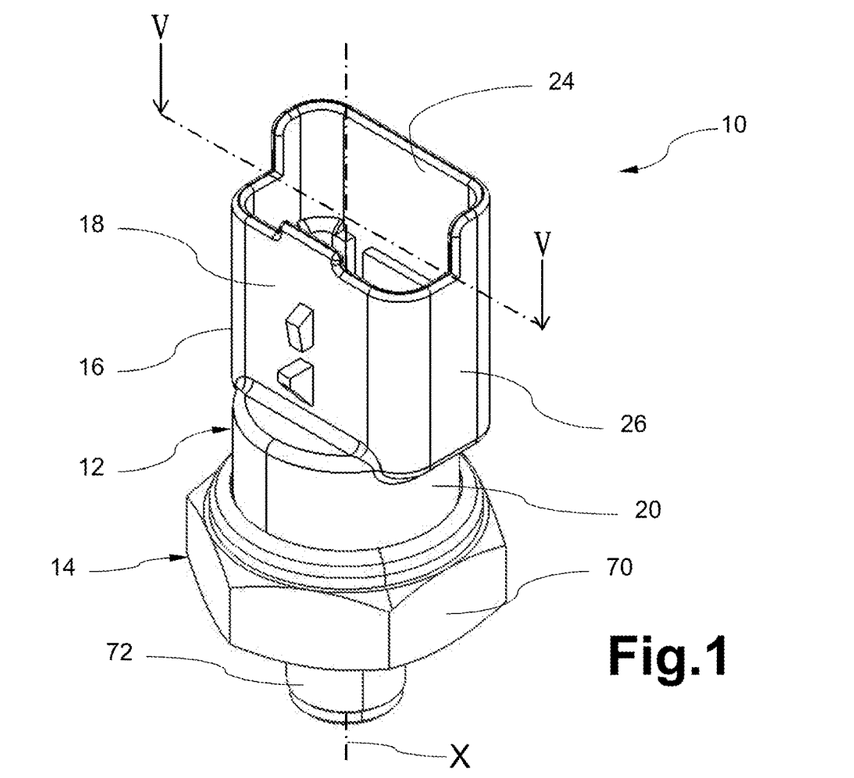
FIG. 1 shows a perspective view of a measuring system according to a first embodiment of the invention.

A system for measuring a physical parameter of a fluid according to a first embodiment of the invention was schematically shown in FIG. 1. This system is designated by the general reference 10. This system 10 applies more particularly to the determination of a physical parameter of a fluid of a motor vehicle circuit. This system 10 is more particularly, but not exclusively, adapted to the measurement of the pressure or the temperature of the fluid circulating in such circuits or else to the measurement of the humidity residing in these circuits.

Such a measuring system 10 is particularly adapted to be installed in different circuits of the motor vehicle such as brake assist circuits, vacuum circuits for driving the auxiliaries, fuel circuits, fuel vapor and/or oil vapor circuits, cooling circuits, pollution control fluid circuits (urea solution, particle filter additives), etc.

As illustrated in FIG. 1, this system 10 comprises in particular a device 12 for measuring the fluid physical parameter as well as a support 14 of the measuring device 12.

This device 12 comprises a casing 16 having a main axis X. The casing 16 comprises a distal connector portion 18 and a proximal measuring portion 20. In the present description, an element will be qualified as proximal or distal depending on whether it is axially near or remote from the measuring point of the measuring device 12.

Figure 5:
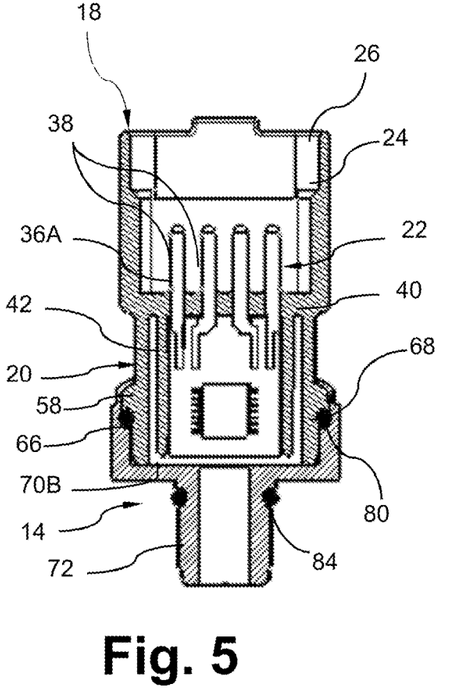
FIG. 5 is a sectional view of the system along the axis V-V of FIG. 1.

According to the invention and as illustrated in FIG. 5, the distal connector portion 18 comprises a connector 22 for electrical connection to an external electrical circuit (not shown). Preferably, the distal portion 18 comprises a body formed by an end-piece 26 delimiting a hollow body 24 inside which the connector 22 protrudes.

Figure 4A:
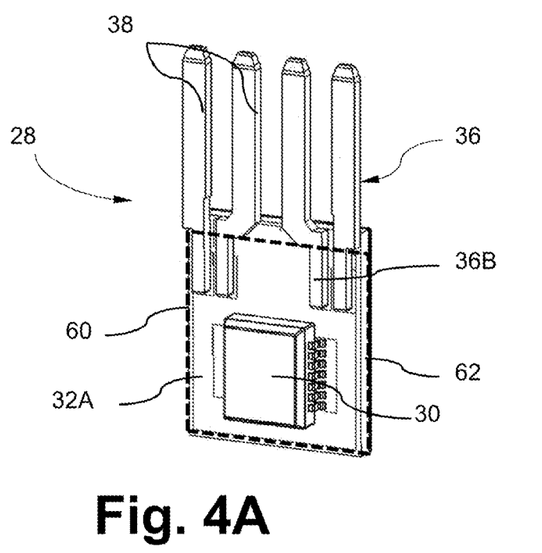
FIGS. 4A and 4B are perspective views respectively of a first face and a second face of the detection element of the measuring system visible in FIGS. 2 and 3.
Figure 4B:
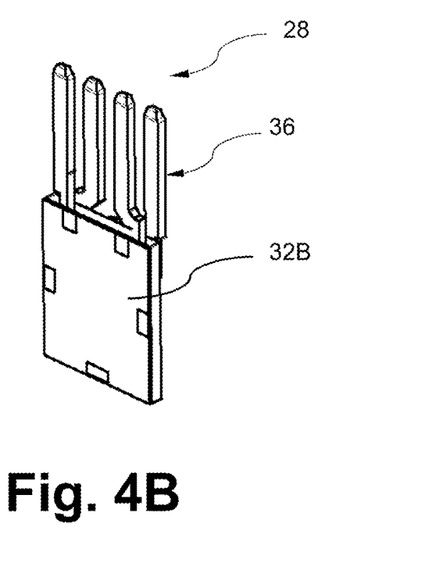

The proximal measuring portion 20 comprises a detector 28 of the physical parameter 28 configured to be in fluid contact with the medium to be studied which is shown in detail in FIGS. 4A and 4B. The detector 28 comprises at least one element 30 sensitive to a physical parameter selected from a humidity sensor, a pressure sensor, and a temperature sensor. According to the invention, the detector 28 has a general shape of a wafer 32 delimiting first 32A and second 32B opposite faces. Of course, the detector 28 may include several elements 30 sensitive to distinct parameters, supported on the wafer 32.

Within the meaning of the present invention, the term «wafer» element any element in which a dimension (the thickness) is negligible relative to the other two dimensions. This wafer 32 can have flat or curved, concave or convex opposite faces 32A, 32B. The wafer 32 can indifferently have a square or rectangular shape, or possibly other geometric shapes.

In this example, the sensitive element 30 comprises an electronic component, for example an ASIC type component (ASIC for «Application-Specific Integrated Circuit»). This electronic component 30 is for example carried by the first face 32A of the wafer 32. The detector 28 comprises in this example at least one pressure-sensitive element and at least one temperature-sensitive element.

The wafer 32 may be made for example of ceramic, constituted, for example, essentially of alumina and the component 30 may be attached by screen printing on the wafer or else by welding or brazing or else by a combination of these techniques. This wafer 32 can, in this case, incorporate a deformable membrane associated to a piezoresistive material arranged according to a Wheatstone bridge architecture. In a manner known per se, a deformation of the membrane causes a variation in resistance and therefore a variation in voltage. This variation in voltage is related to the pressure exerted on the membrane by a predefined correlation law.

Alternatively, the element 30 can include an electromechanical microsystem chip (MEMS) for example provided with a sensitive membrane and a stress detection circuit allowing to measure the compression state of the membrane which is proportional to the fluid pressure. In this case, the wafer can also be conventionally a printed circuit board known per se commonly designated by the indication PCB.

In FIGS. 2 to 5, it can be seen that the device 12 also comprises a member 36 for electrically joining the detector 28 and the connector 22. Preferably and as illustrated in FIG. 5, the connector 22 is formed by a distal portion 36A of the electrical junction member 36 protruding inside the connector portion 18. Furthermore, the junction member 36 preferably comprises a proximal portion 36B which is fastened to the detector 28.

To this end, for example, the junction member 36 comprises a plurality of metal pins 38 which protrude in the extension of a face 32A of the detector 28 (FIG. 4A).

Furthermore, as visible in FIG. 5, the connector 18 and detector 20 portions are transversely separated from each other by a partition wall 40 provided with at least one through orifice through which the electrical junction member 36 extends on both sides of the wall 40.

Preferably, the detector portion 20 delimits a housing 42 configured to vertically receive and retain the detector 28 such that the faces 32A, 32B of the detector 28 extend substantially parallel to the main axis X. The housing 42 is configured to extend axially from the partition wall 40 and comprises a distal end 42A fastened to the partition wall 40 and a proximal free end 42B.

Figure 6:
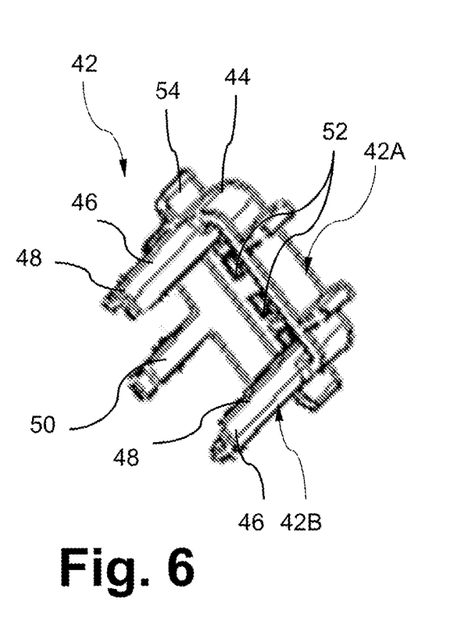
FIG. 6 is an enlarged view of a housing of the detection element shown in FIGS. 4A and 4B.
Figure 7:
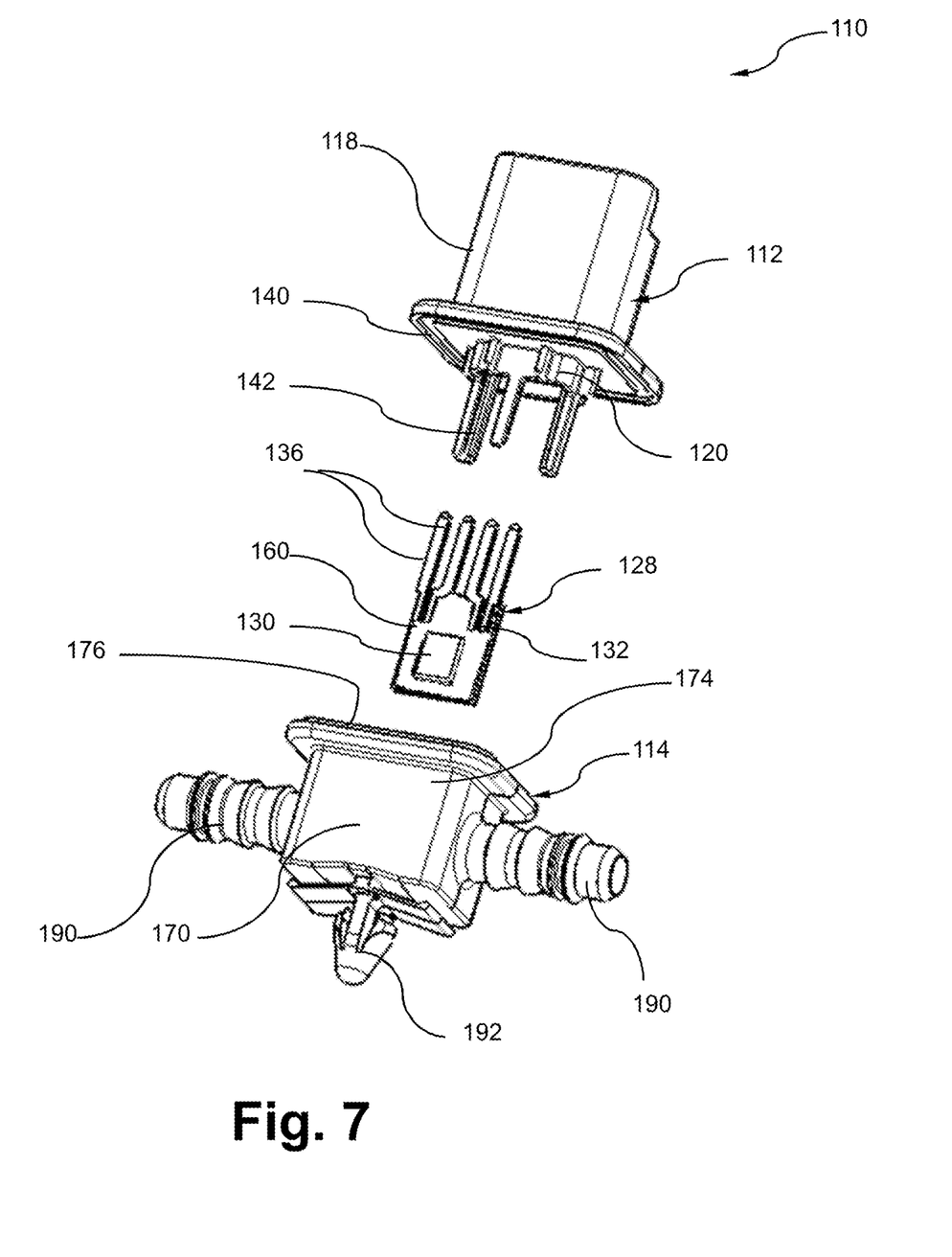
FIG. 7 is an exploded perspective view of a measuring system according to a second embodiment of the invention.

The housing 42 comprises in the example illustrated in FIGS. 6 and 7, at its distal end 42A, a base 44 which forms a tray to contain a sealing material that can flow, for example a polymer resin. Furthermore, preferably, the housing 42 is almost totally perforated on its proximal end 42A in order to allow circulation of the fluid around the detector 28.

For example, the housing 42 is formed, at its proximal end 42B, by guide elements 46 comprising profiled guide rails 48. For example, the guide elements 46 comprise two wedge-like profiled lateral guide rails 48 and at least one tab-like shaped central guide rail 50.

Furthermore, preferably and as visible in FIG. 6, the base 44 comprises, at the bottom, at least one orifice 52 for the passage of the junction member 36 so that the latter can pass through the partition wall 40 on which the housing 42 is attached, to the detector portion 20 and extend on both sides of this wall 40. In this example, there are as many passage orifices 52 as pins 38 in the junction member 36. Furthermore, the housing 42 comprises, for example, stiffening fins 54 extending at the periphery of the tray 44.

In accordance with the invention, the device 12 further comprises a fluid sealing body 60 arranged such that the electrical junction of the measuring device 12 in the operating position, is sealingly isolated from the fluid and shaped to intimately envelop at least the proximal end 28B of the detector 28. More specifically, the detector 28 is configured to be in direct fluid contact through the sealing body 60 in order, for example, to facilitate heat exchanges. Preferably, the sealing body 60 is configured to intimately cover at least the first electrical contact face 32A of the detector 28 by ensuring a sealing continuity with a junction area of the detector 28 with the electrical junction member 36. Furthermore, preferably, the detector 28 is configured in the device 12 such that both faces of the detector 28 are immersed and in direct fluid contact.

Preferably and as illustrated in FIG. 4A, the sealing body 60 is formed by a coating layer 62 deposited on at least the face 32A carrying the sensitive element 30 on the surface of the detector 28 (schematically shown in this FIG. 4A in dashed lines). The layer 62 is made for example from a sealing material that can flow in a first state and that can be solidified in a second state, for example a polymer resin.

The operational characteristics of the resin are in particular a chemical resistance to the fluid circulating in the conduit, a thermal resistance within a predefined temperature range (for example −40° C. to +150° C.), an adhesion to the printed circuit wafer 32, a sufficient thermal conductivity, a relatively flexible formulation to prevent the deterioration or the displacement of components mounted on the wafer 32.

For example, the epoxy resins with a flexible formulation and a high glass transition temperature (greater than 150° C.) or a silicone resin for fluid applications other than fuel and motor oil, might be suitable.

Furthermore, preferably, the sealing material of the sealing body 60 is configured to solidify in the tray 44 in order to form a mass 64 for anchoring the distal end 28B of the detector 28, the tray 44 comprising at the bottom an orifice 52 for the passage of the junction member 36.

Figure 2:
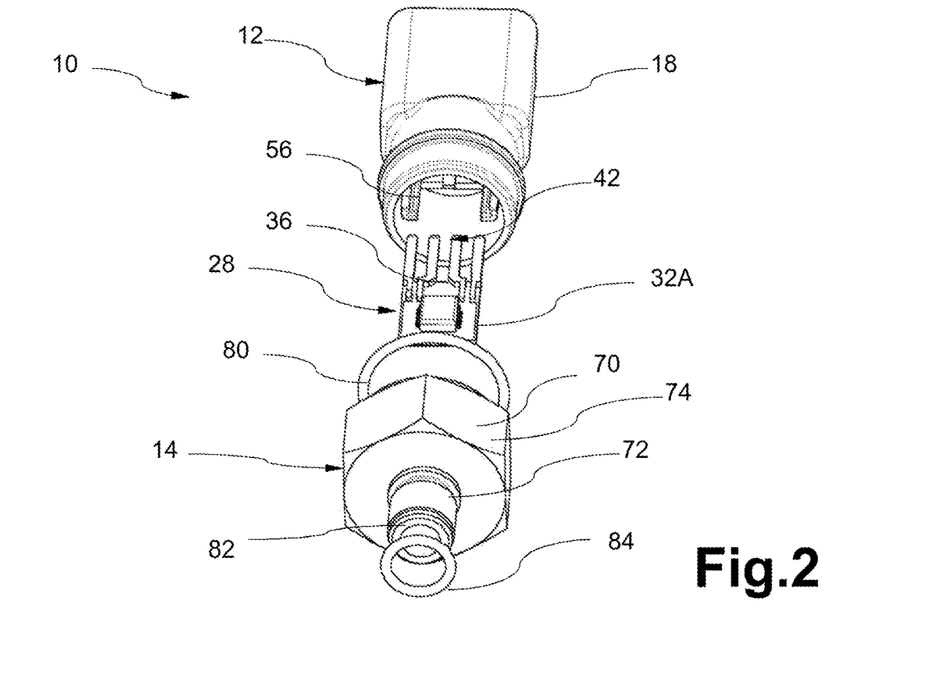
FIG. 2 is an exploded perspective bottom view of the system of FIG. 1.
Figure 3:
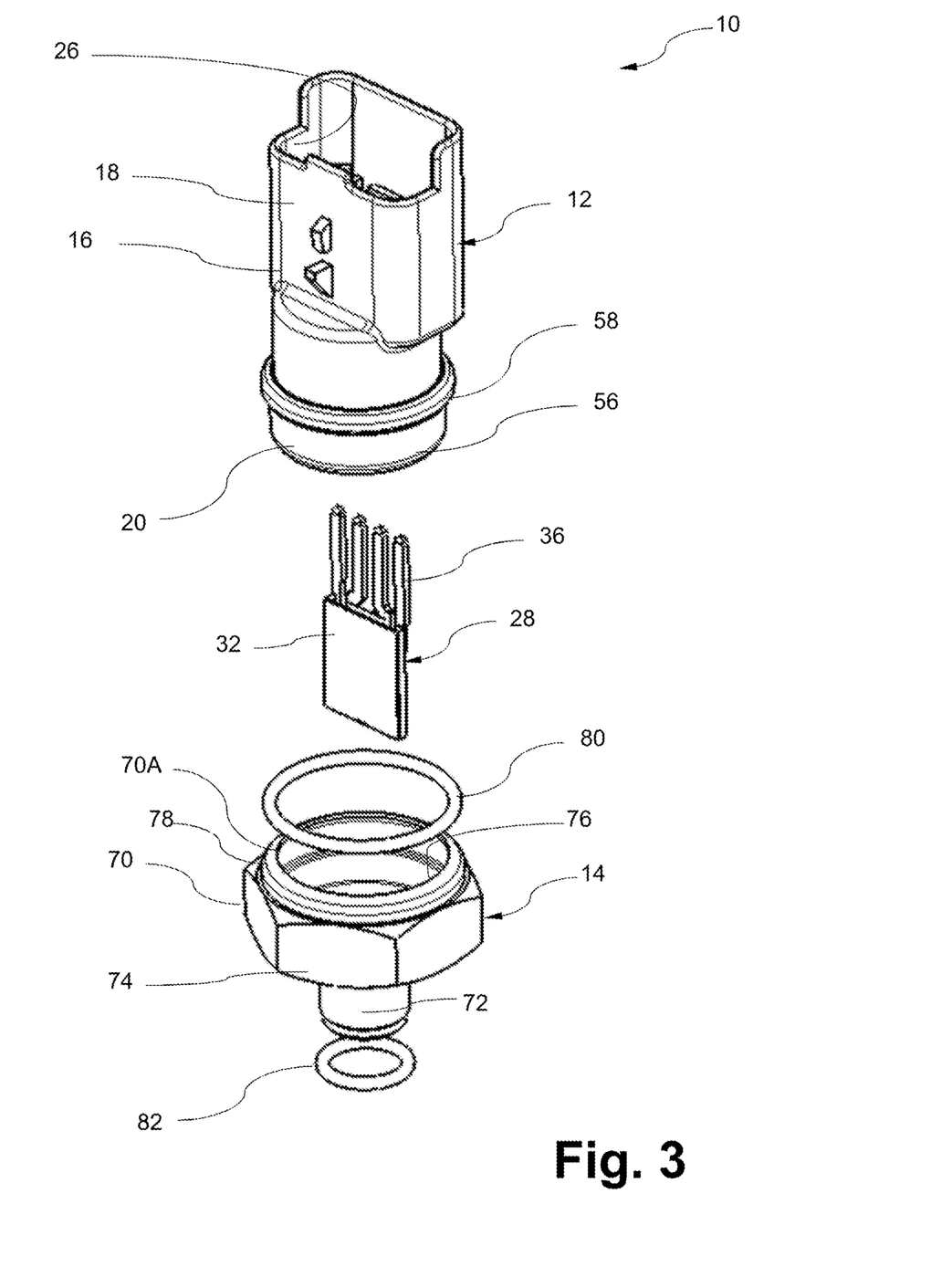
FIG. 3 shows an exploded perspective view of the system of FIG. 1.

In the example described and illustrated in FIG. 2, the detector portion 20 also comprises an outer peripheral skirt 56 surrounding the housing 42, the latter extending axially inside the skirt 56.

This outer peripheral skirt 56 further comprises on its outer wall a peripheral bead 58. This relief 58 is configured to cooperate with a complementary relief 66 formed on the support 14 described in more detail below.

In this first embodiment illustrated in FIGS. 1 to 6, the support 14 comprises a cylindrical portion of revolution 70 about the main axis X and an axial extension 72 configured to be inserted inside an orifice of a fluid circulation conduit (not shown in the figures).

In this example, the cylindrical portion of revolution 70 has an open distal end 70A and a closed proximal end 70B communicating with the medium to be measured via the axial extension 72. The cylindrical portion 70 further delimits a peripheral outer wall 74 provided, for example, with a hexagonal shape and an inner wall delimiting with the proximal end 70B a measuring chamber 76 in which the detector 28 in operation is configured to extend.

In the example illustrated, in particular, in FIG. 1, the support 14 and the device 12 are assembled by crimping. For example, in order to assemble the support 12 and the device 14, the peripheral wall 74 is provided with an end edge 78 retaining the device by crimping around the bead 58 of the device 12. To this end, the peripheral wall 74 of the support 14 comprises a thinned portion forming the end edge 78 configured to be crimped.

Furthermore, as visible in FIG. 5, the inner peripheral wall of the support 12 has a recess forming the complementary relief 66. In the operating position, the front face of the skirt 56 abuts against the bottom of the chamber 76 of the support 12 such that the two reliefs 58 and 66 together delimit a peripheral groove 68 for receiving an environment O-ring seal 80. Moreover, the end-piece forming an axial extension 74 of the support 12 is provided with a peripheral slot 84 for receiving an O-ring seal 82 configured to cooperate with the conduit in which the fluid circulates, which is not shown.

Figure 11:
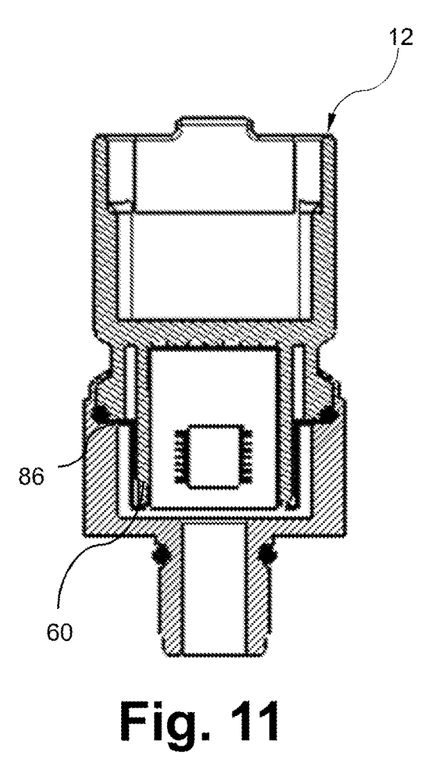
FIG. 11 shows a sectional view of the measuring system according to a variant of the first embodiment of the invention.

In a variant illustrated in FIG. 11, the sealing body 60 is made of an elastically deformable material such as an elastomer. In this case, the sealing body 60 is provided with a peripheral edge provided with a thickened free end forming a sealing lip 86. This lip 86 has the function of providing the sealing to the environment and is advantageously positioned inside the peripheral groove 68.

A determination system according to a second embodiment is shown in FIGS. 7 to 10. In this second embodiment, the elements similar to those of the first embodiment carry references increased by one hundred.

In this embodiment, the support 114 comprises two end-pieces 190 for connection to at least two segments of an external fluid circulation conduit (not shown). Furthermore, the support 114 comprises a measuring chamber 176 in the shape of a generally rectangular tank 170. This chamber 176 also has a peripheral side wall 174 from which extend both connecting end-pieces 190. Furthermore, the support 114 comprises, for example, a pin 192 for anchoring to a fixed structure (not shown) mounted axially from the bottom of the tank 170.

In this embodiment, the device 12 and the support 14 comprise elements for assembling by embedding for example by cooperation of peripheral slot and tooth elements formed on the device 12 and the support 14. Alternatively, the device 12 and the support 14 can be assembled by laser welding or others.

Figure 8:
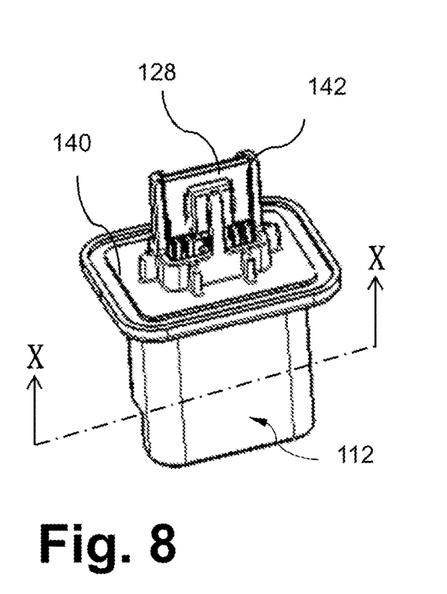
FIGS. 8 and 9 are perspective views from distinct points of view of a measuring device of the measuring system of FIG. 7.
Figure 9:
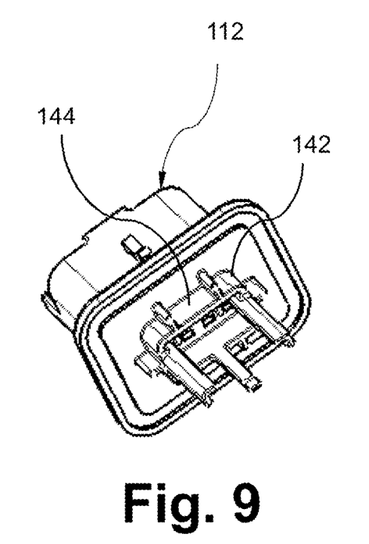
Figure 10:
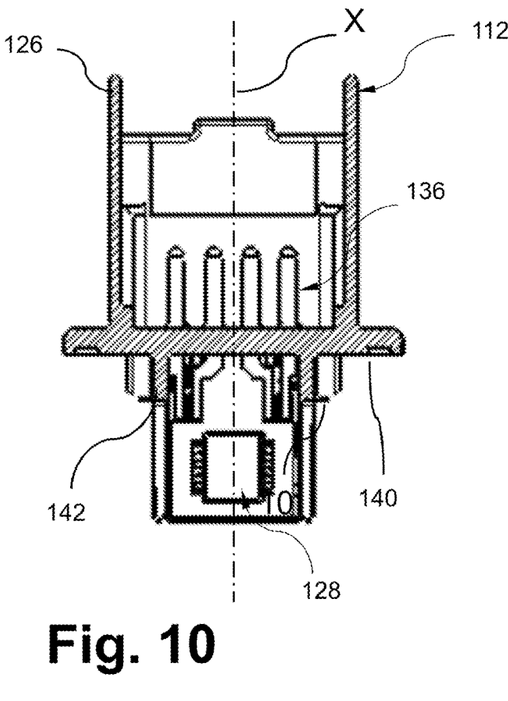
FIG. 10 shows a sectional view along the axis X-X of the measuring device of FIG. 8.

Furthermore, as shown in FIGS. 8 and 9, the measuring device 112 comprises a connector end-piece 126 mounted on a stand 140 forming the partition wall 140 between the connector portion 118 and the detector portion 120. The housing 142 extends axially from this stand 140 such that the detector 128 in the operating position is completely immersed.

In this second embodiment, the sealing body 160 is formed by a coating layer just like the previously detailed sealing body 60. Particularly, the housing 142 has the same configuration as the housing 42. The measuring device 112 therefore has a very simple manufacture, a minimal space requirement and a high robustness and reliability.

Figure 12:
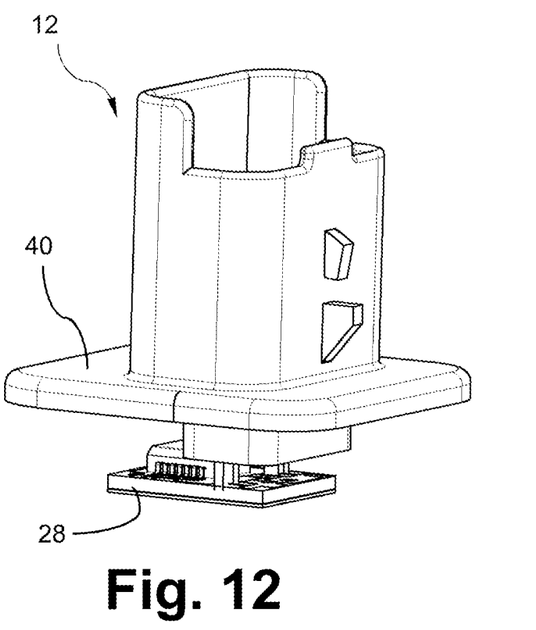
FIGS. 12 to 14 show side and sectional perspective views of a measuring system according to a third embodiment of the invention.
Figure 13:
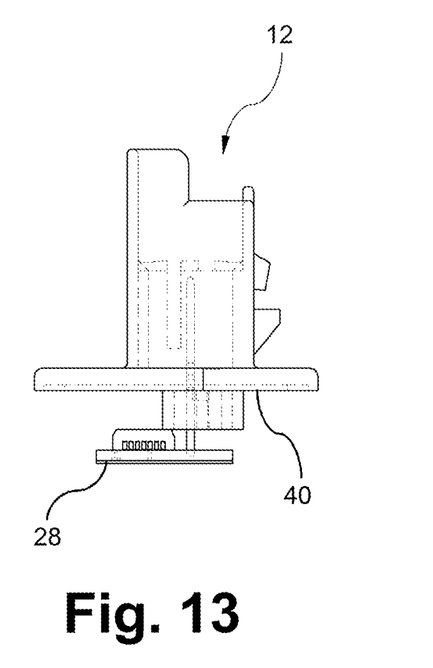
Figure 14:
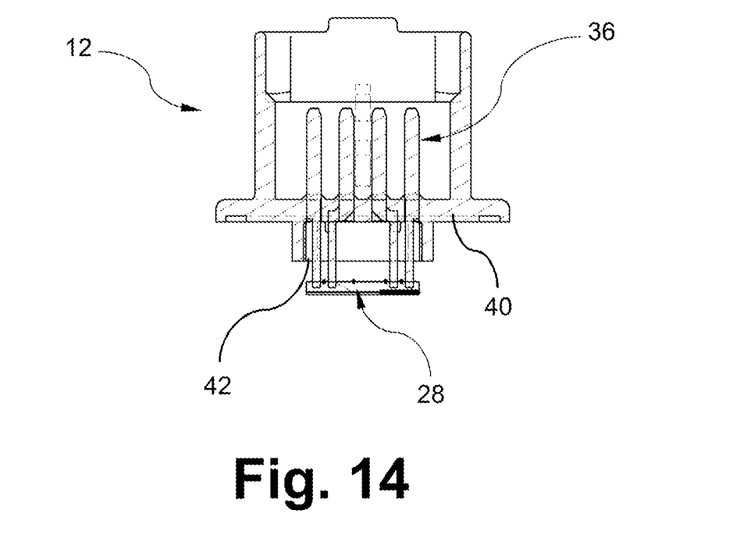

The measuring device 12 according to a third embodiment is shown in FIGS. 12 to 14. The elements similar to the first embodiment have identical references.

According to FIG. 12, the measuring device 12 comprises a casing 16 having a main axis X with a distal connector portion 18 and a proximal measuring portion 20.

In FIGS. 2 to 5, it can be seen that the device 12 also comprises a member 36 for electrically joining the detector 28 and the connector 22. Preferably and as illustrated in FIG. 5, the connector 22 is formed by a distal portion 36A of the electrical junction member 36 protruding inside the connector portion 18. Furthermore, the junction member 36 preferably comprises a proximal portion 36B which is fastened to the detector 28.

To this end, for example, the junction member 36 comprises a plurality of metal pins 38 which protrude orthogonally to the electrical contact face 32A of the detector 28 (FIG. 4A).

Furthermore, as visible in FIG. 5, the connector 18 and detector 20 portions are transversely separated from each other by a partition wall 40 provided with at least one through orifice through which the electrical junction member 36 extends on both sides of the wall 40.

Preferably, the detector portion 20 delimits a housing 42 inside which the pins of the member 36 extend and engage orthogonally in the detector 28. The detector 28 extends transversely in this third embodiment.

The main aspects of the manufacture of a measuring system will now be described, according to the first embodiment. It will be understood that the following description is transposable to the second or third embodiment without this being more detailed.

Beforehand, during a step which is not illustrated, the different components of the system 10 are manufactured. The manufacture of the components is relatively simple and can be performed by injection molding or else by machining depending on the used materials or according to yet other manufacturing methods. For example, in order to manufacture the measuring device 12, a plastic material is molded. This molding is provided to integrally form, the connector 22, the outer skirt 56, the nesting reliefs 58 and 66 as well as the housing 42.

The pins 38 are, during an assembly step, mounted on the wafer 32 of the detector 28. The pins 38 are, for example, forcibly mounted inside the passage orifices 52 provided to this end.

The detector 28 thus provided with the pins 38 is inserted into the housing 42 thanks to the guide rails until the pins 38 pass through the partition wall 40 to protrude inside the hollow body 24 of the connector portion 18. The pins 38 can be forcibly mounted inside the passage orifices 52 provided to this end. However, alternatively, the pins 38 can be overmolded during the first step of manufacturing the measuring device 12.

Then, during a first step of applying the sealing material, the sealing material of the sealing body 60 is layered on the face 32A of the wafer 32 of the detector 28 carrying the electronic components. This partial covering of the wafer 32 on a single face is preferred when a covering of the opposite face provided with a pressure-sensitive surface could affect the reliability of the pressure measurement.

In other cases, preferably, the covering of the two faces of the wafer 32 is performed. In this manner, the detector 28 is isolated from the medium while ensuring, at the same time, efficient operational characteristics thanks to the direct contact with the detector 28.

Preferably such that the sealing material fills the tray 44 of the housing 42.

During a third assembly step illustrated in FIG. 5, the environment seal 80 can be positioned around the outer wall of the skirt 56 of the measuring device 12 such that it extends below the bead 58. The device 12 is then mounted inside the support 14.

Thereafter, a last step of crimping the end edge of the peripheral wall 74 on the device 12 completes this assembly and allows obtaining the system 10 shown in FIG. 1.

This system as shown above has many advantages, in particular a high robustness, a simplicity of production and complementary performances of measurement reliability thanks to increased exchanges with the medium.

The invention is not limited to the previously described embodiments. Other embodiments within the reach of those skilled in the art can also be considered without departing from the scope of the invention defined by the claims below.

The invention claimed is:

1. A device for measuring at least one physical parameter of a fluid, comprising a casing having a main axis, said casing comprising:

a distal connector portion comprising a connector for electrical connection to an external electrical circuit;

a proximal measuring portion comprising a detector of the physical parameter configured to be in fluid contact, the detector has a general shape of a wafer delimiting a first electrical contact face and a second opposite measuring face, a member for electrically joining the detector and the connector;

wherein the device comprises a fluid sealing body configured to intimately cover at least the first electrical contact face of the detector by ensuring a sealing continuity with a junction area of the detector with the electrical junction member and in that the detector is configured in the device such that both faces of the detector are immersed and in direct fluid contact.

2. The device according to claim 1, wherein the measuring portion delimits a housing configured to vertically receive and retain the detector such that the faces of the detector extend substantially parallel to the main axis.

3. The device according to claim 1, wherein the detector extends transversely and is retained to the measuring portion via the junction member.

4. The device according to claim 1, wherein the first face carries at least one electronic component and/or an electronic circuit and the second face is provided with a pressure-sensitive surface.

5. The device according to claim 1, wherein the sealing body is configured to intimately envelop the two faces of the detector.

6. The device according to claim 5, wherein the connector and detector portions are transversely separated from each other by a partition wall provided with at least one through orifice through which the electrical junction member extends on both sides of the wall.

7. The device according to claim 1, wherein the connector is formed by a distal portion of the electrical junction member protruding inside the connector portion.

8. The device according to claim 1, wherein the junction member comprises a plurality of metal pins which protrude in the extension of a face of the detector or protrude orthogonally to a face of the detector.

9. The device according to claim 1, wherein the connector portion comprises an end-piece delimiting a hollow body inside which the connector protrudes.

10. The device according to claim 1, wherein the sealing body is formed by a coating layer deposited on at least the first face of the detector made from a sealing material that can flow in a first state and that can be solidified in a second state.

11. The device according to claim 1, wherein the housing comprises, at a distal end, a base which forms a tray to contain a sealing material that can flow.

12. The device according to claim 11, wherein the sealing material is configured to be solidified in the tray in order to form a mass for anchoring a distal end of the detector, the tray comprising at the bottom an orifice for the passage of the junction member.

13. The device according to claim 1, wherein the sealing body is formed by a single sealing material configured to at least partially cover the outer surface of the detector by forming a layer and to form a mass at the distal end of the detector.

14. The device according to claim 1, wherein the housing extends axially and is almost totally perforated on its proximal end in order to allow circulation of the fluid around the detector.

15. The device according to claim 1, wherein the housing is formed at its proximal end by profiled guide rails.

16. The device according to claim 1, wherein the sealing body is provided with a peripheral edge provided with a thickened free end forming a sealing lip configured to be partially housed in a peripheral groove of the casing.

17. The device according to claim 16, wherein the sealing body is made of an elastically deformable material.

18. The device according to claim 1, wherein the detector comprises at least one element sensitive to a physical parameter selected from a humidity sensor, a pressure sensor and a temperature sensor.

19. The device according to claim 1, wherein the wafer of the detector comprises a main portion and an axial extension having a narrowed cross-section.

20. A system for measuring a fluid parameter, comprising a device for detecting a physical parameter and a support of the measuring device, said support comprising a fluid circulation chamber, wherein the measuring device being according to claim 1, the device and the support comprise complementary assembly element and in that, in the assembled position, the detector is configured to extend inside the fluid circulation chamber.

21. The measuring system according to claim 20, wherein the support comprises two end-pieces for connection to at least two segments of an external fluid circulation conduit.

22. The system according to claim 20, wherein the support comprises a cylindrical portion of revolution about the main axis forming the measuring chamber and an axial extension configured to be inserted inside an orifice of a fluid circulation conduit.

23. The system according to claim 20, wherein the device and the support delimit, in the assembled state, a peripheral groove for receiving an environment O-ring seal.

* * * * *